United States Patent [19]

Ingram

[11] 4,210,965
[45] Jul. 1, 1980

[54] ACOUSTIC WELL LOGGING METHOD AND APPARATUS FOR DETECTING AND MEASURING AN ACOUSTIC WAVE

[75] Inventor: John D. Ingram, Meudon, France

[73] Assignee: Schlumberger Technology Corp., New York, N.Y.

[21] Appl. No.: 928,715

[22] Filed: Jul. 27, 1978

Related U.S. Application Data

[62] Division of Ser. No. 581,381, May 27, 1975, abandoned.

[51] Int. Cl.² .............................................. G01V 1/40
[52] U.S. Cl. ........................................ 367/26; 367/27; 367/29; 367/30; 364/422; 328/146
[58] Field of Search ............... 340/15.5 BH, 15.5 AP, 340/15.5 AC; 181/102, 103; 250/265, 269; 364/422; 328/146, 135, 150

[56] References Cited

U.S. PATENT DOCUMENTS

| | | | |
|---|---|---|---|
| 3,237,153 | 2/1966 | Blizard | 340/15.5 BH |
| 3,289,157 | 11/1966 | Brokaw | 340/15.5 AP |
| 3,292,729 | 12/1966 | Blizard | 340/15.5 BH |
| 3,829,858 | 8/1974 | Bergkvist | 343/5 CF |
| 3,900,824 | 8/1975 | Trouiller et al. | 181/103 |
| 4,040,001 | 8/1977 | Vivet et al. | 328/165 |
| 4,077,038 | 2/1978 | Heller et al. | 343/7 A |

FOREIGN PATENT DOCUMENTS 7301681  8/1973  Netherlands ..................... 340/15.5 BH

OTHER PUBLICATIONS

Scott et al., "Acoustic Logging for Mining Applications", 6/5/74, pp. 1-10, SPWLA 15th Annual Logging Symp.

Primary Examiner—Nelson Moskowitz
Attorney, Agent, or Firm—Kenneth Olsen; Henry N. Garrana; Louis H. Reens

[57] ABSTRACT

A method and apparatus are described for detecting an acoustic wave in a waveform produced from a sonic receiver in response to an acoustic investigation of a borehole. The maximum amplitude of the waveform is measured and a portion thereof utilized as a threshold for comparison with successively different combinations of initial portions of the waveform and the waveform location, where the threshold is exceeded, is identified as the location of the wave. A pattern comparison is made between waveform segments where the acoustic wave is initially located to provide a correction factor for a more accurate locating of the acoustic wave. A parameter of the wave, such as its interval travel time is measured with the acoustic wave locating techniques.

21 Claims, 12 Drawing Figures

Fig. 7.

ACOUSTIC WELL LOGGING METHOD AND APPARATUS FOR DETECTING AND MEASURING AN ACOUSTIC WAVE

This is a division of application Ser. No. 581,381, filed May 27, 1975, now abandoned.

FIELD OF THE INVENTION

This invention relates to a method and apparatus for well logging. More specifically, this invention relates to a method and apparatus for determining parameters of acoustic waves to investigate an acoustic medium within the sphere of influence of an acoustic borehole logging tool.

BACKGROUND OF THE INVENTION

Acoustic well logging techniques and tools are extensively described in the art. Acoustic well logging is used to provide surveys of formations traversed by earth boreholes. In particular, measurements are made of the velocities of acoustic waves to reveal valuable information concerning the type of rocks and the porosity of the rocks in the formation surrounding the borehole. A commonly measured acoustic parameter is the velocity of compressional waves. However, other acoustic wave parameters such as the velocity of shear waves and other modes of acoustic energy are also useful in evaluating the formation.

An acoustic well logging tool for measuring the velocity of acoustic waves typically employs a sonic pulse transmitter and a plurality of sonic receivers selectively spaced from the transmitter. The sonic receivers include transducers to convert the incident acoustic wave to an electrical waveform and suitable amplifiers to transmit the waveforms to surface located processing equipment.

The spacings between the sonic receivers and the transmitter influence the character of the parameter measurement. For example, a longer spacing enables a greater effect of the formation characteristics on the sonic wave with the possibility that wave analysis can thus reveal more useful data about the formation. On the other hand, a longer spacing results in the arrival of greatly attenuated sonic waves making their analysis more difficult. When many spaced sonic receivers are employed to measure the velocity of the acoustic wave, the need to maintain adequate spacings between each of these receivers results in strongly attenuated waves.

Current sonic well logging tools commonly use one transmitter with a pair of sonic receivers. A double pair of transmitter-receivers has been used in the art, for example to provide compensation for physical misalignments of the tool in the borehole as described in the U.S. Pat. No. 3,304,537 to Schwartz. A three receiver, single transmitter sonic well logging tool has been described in U.S. Pat. No. 3,390,377 to Elliott et al. Generally, when the number of receivers is increased to improve the velocity measurement, special techniques are needed to process the increase in the flow of signals and enhance the accuracy of sonic wave parameter measurements.

The use of computers in determining any of several correlation functions between two signals is a well established field. Much literature has been written on the subject and general reference may be made, for example, to a book entitled "Statistical Communication and Detection" written by E. A. Robinson and published by the Hafner Publishing Company of New York in 1967. Of particular interest in this book is the section dealing with numerical filtering methods for digital computers. Various correlation techniques are described.

In a well logging technique in accordance with the invention the location of a wave in a waveform can be accurately detected. In accordance with one such technique for the first motion in the waveforms is detected. A gauge value representative of the magnitude of the waveform is determined and used to derive a threshold level. A comparison technique is applied to the waveform to detect the time when the waveform first exceeds the threshold. The threshold automatically varies with the amplitude of the waveform, to enable an accurate determination of the first motion with various waveform sizes.

The technique for detecting the first motion is advantageously applied to sampled stored waveforms. The waveform can be quickly scanned to measure its magnitude. A threshold which may be, for example, a predetermined fraction of the magnitude, is then established to detect the first motion. With such technique for detecting a first motion, an automatic compensation for waveform amplitude variation is obtained.

The first motion detection technique is advantageously applied to determine an acoustic wave parameter such as the transit time of a compressional wave by comparing the first motion detections of waveforms derived from different receivers.

The first motion detection technique may be further advantageously employed to control the start of a multiple fold correlation process to determine the acoustic wave parameter of a sonic wave present in a set of waveforms. The first motion detection determines the location of a first segment for a first waveform. This segment is then correlated with other waveform segments whose positions are varied as a function of a range of values of the acoustic wave parameter. In effect, the time to execute the correlation technique may be advantageously reduced by precisely determining a starting place with the first motion detection.

In another technique for determining the location of an acoustic wave in a waveform a pattern comparison is used to determine where the best similarity between the waveforms occurs. As described with reference to one embodiment the pattern comparison technique includes the detection of the first motion of the compressional wave in each of a plurality of sampled waveforms. Thereupon a comparison window is formed of a predetermined number of waveform samples and a pattern comparison is made between the window samples in the respective waveforms in the vicinity of the first motions.

The comparison windows are relatively aligned for different samples over a preselected range to precisely detect the sample index value yielding the best pattern similarity. The difference between the first motion detections is then corrected for the amount of alignment needed to obtain the best similarity of the patterns to determine the velocity of the compressional wave.

The pattern comparison well logging technique for determining an acoustic wave parameter may be rapidly completed for each set of waveforms to facilitate real time processing of the waveforms with relatively slow but economical processors.

It is, therefore, an object of the invention to provide a method and apparatus for accurately determining the location of an acoustic wave in waveforms representative of sonic waves detected during sonic well logging.

It is a further object of the invention to provide method and apparatus for accurately determining the first motion on waveforms derived with a sonic well logging tool.

The novel features of the present invention are set forth with particularity in the appended claims. The operation, together with further objects and advantages of the invention, may be best understood by way of illustration and examples of certain embodiments when taken in conjunction with the accompanying drawings.

DETAILED DESCRIPTION OF DRAWINGS

FIGS. 1, 2, 3

Figure 1:
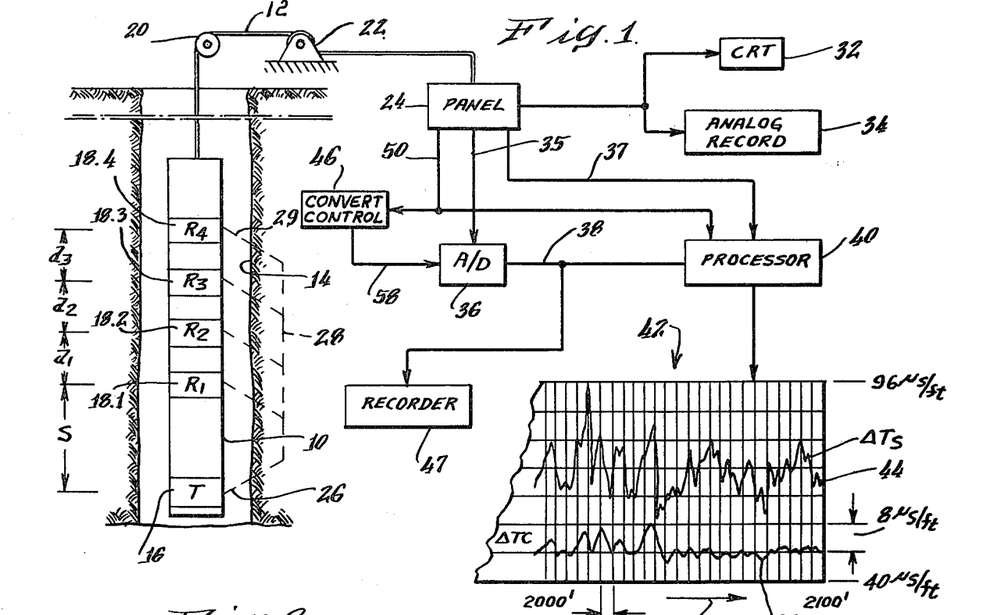
FIG. 1 is a schematic block diagram of a system employed to obtain acoustic wave parameter determinations in accordance with the invention.

With reference to FIG. 1 a sonic borehole logging tool 10, with centering elements deleted, is shown suspended from a cable 12 in a borehole 14. The tool 10 includes a transmitter 16 located at the bottom of the tool and at least three and preferably four selectively spaced sonic receivers 18.1, 18.2, 18.3 and 18.4. The cable 12 is shown fed over a pulley 20 from a cable supply 22 and is electrically connected to a panel 24. The panel 24 includes suitable amplifiers, switching circuits and electrical supplies for tool 10 and the firing of sonic transmitter 16. The tool 10 includes suitable amplifiers and controls needed to enable receivers 18 to sequentially detect sonic waves and provide panel 24 with waveforms representative of the acoustic waves incident upon transducers in receivers 18.

Figure 2:
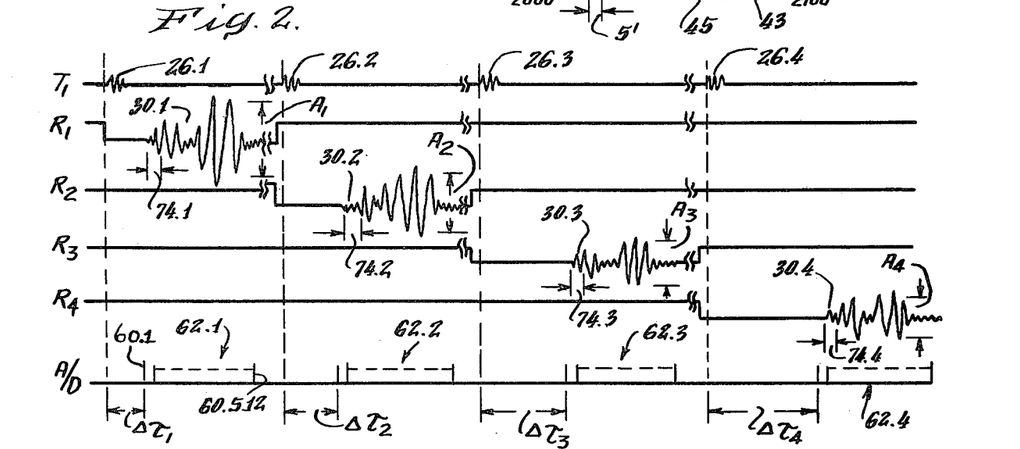
FIG. 2 is a timing diagram of the operation of several components of the system depicted in FIG. 1.

In the operation of the sonic logging tool 10, the transmitter 16 is regularly energized (about ten times per second) to produce sonic pulses such as 26 in FIG. 2 while the tool is moved upwardly at a speed of the order of a foot per second. Each pulse 26 is directed at the formation in which an acoustic wave such as 28 is launched. The acoustic wave 28 has components which travel through the formation towards the receivers 18 and in turn produce wave components 29 which are incident upon the receivers 18 to produce a set of waveforms such as 30.1, 30.2, 30.3 and 30.4 shown in FIG. 2. Waveforms 30 may also include those sonic waves which, after travel through the borehole, are incident upon receivers 18.

Although the transmitter is regularly activated, the receivers 18 preferably are alternately enabled to generate waveforms in the sequence as shown by waveforms 30.1–30.4. In this manner, waveforms which are of several milliseconds duration can be analyzed to detect acoustic wave parameters in various waveform segments such as those reflecting the presence of compressional or shear waves. In addition, the sequential enabling of receivers 18 allows their outputs to be multiplexed onto a common line towards panel 24. This is an advantage when the analog form of the outputs of receivers 18 is to be conducted to panel 24 since the analog waveforms 30 are all exposed to the same electronic amplification and cable attenuation to enable amplitude comparisons. The advance of the tool 10 during the time needed to generate one complete set of waveforms 30 can be controlled and is not sufficient to appreciably affect velocity measurements.

The receivers 18 each bear a known spacing "d" from each other while the distance "S" between receiver 18.1 and transmitter 16 is known to further accurately locate all the receivers from transmitter 16. When, for example, the arrival of the compressional wave is precisely detected at each receiver, then the time between respective receiver arrivals provides an accurate determination of the velocity of the compressional wave. By employing a multiple number of receivers 18 such as four with tool 10, a more accurate and reliable determination of wave velocities can be made.

When a large number of receivers 18 are used, the maximum peak-to-peak amplitude, A, for the waveforms 30 decreases with the distance between the receivers 18 and transmitter 16. The attenuation of the acoustic waves 28 can become so great that the resulting waveforms from the more remote receivers are difficult to use with conventional wave velocity determining techniques available in the field. Such attenuation renders velocity determinations particularly difficult when three receiver spacings "d" of the order of one foot and a transmitter to receiver spacing "S" of about eight feet is employed. An increase in the acoustic energy of pulses 26 cannot readily be used to compensate for the attenuation.

The waveforms 30 may arrive at the panel 24 either in analog form or in sampled form. For example, the tool 10 may be provided with an analog to digital (A/D) converter to sample waveforms 30. The samples are then transmitted along cable 12 to panel 24 for further processing.

In the practice of methods of this invention for automatically determining acoustic wave parameters of sonic waves generated during well logging, waveforms are produced representative of sonic waves from receivers such as 18. The waveforms may be produced in analog form such as from an analog record 34, or directly from receivers 18. Alternatively, the waveforms may be produced in sampled or digitized form from a previous sample recording or from an A/D converter 36 located either near panel 24 as shown in FIG. 1 or downhole with tool 10.

In the system depicted in FIG. 1, the waveforms 30 arrive in analog form at panel 24 where they may be coupled to a cathode ray tube 32 for real-time display and to a magnetic tape recorder 34 to provide an analog record.

The waveforms 30 may be processed in sampled form as shown with the apparatus depicted in FIG. 1 or in analog form such as with the apparatus shown in FIG.

8. In order to utilize a sampled form of waveforms 30 they are shown coupled along a line 35 to an analog to digital converter 36 which generates samples of the waveforms at a high sampling rate on an output line 38.

Although not specifically illustrated in FIG. 1, panel 24 also provides depth signals from a depth sensor operatively coupled to the cable 12. The depth signals preferably are presented on line 37 in a format which is compatible with the format employed for the samples on line 38. The generation of depth signals is well known in the art of well logging and need not be further described. The output from waveform sampler 36 is applied to an apparatus 40 which processes the samples to produce acoustic wave parameter values of a sonic wave present in waveforms 30. The apparatus 40 preferably is a fast digital processor having inputs which can be accessed with digital samples produced with A/D converter 36.

The end product from apparatus 40 may be a plot 42 of, for example, the velocity of the compressional wave, $\Delta T$, in microseconds per foot as a function of well depth. Such plot 42 may be obtained with a plotter capable of responding either with sampled or analog outputs from processor 40.

Plot 42 is shown formed of the variation of the transit times, in microseconds per foot of two sonic waves, as a function of well depth in feet. Curve 43 shows the velocity of the compressional wave $\Delta TC$ and curve 44 shows the velocity of the shear wave $\Delta TS$. The plot 42 is made by moving suitable logging paper in the direction indicated by arrow 45 while the tool is raised as reflected by the indicated depth values.

The analog to digital converter 36 preferably is selected of the type capable of producing samples of waveforms 30 at a very high rate of the order of 4 microseconds per sample. With such high speed waveform conversions improved resolution of sonic wave parameter determinations can be made. In some instances lower sampling rates may be employed.

During the firing of transmitter 16 and sequential enabling of receivers 18, electronics in tool 10 provides waveform identification signals which may be coded pulses such as a two bit code word. Such receiver waveform identification code, together with a pulse to identify the firing time of the transmitter 16 are delivered along cable 12 to panel 24. A magnetic recorder 47 is provided to record the waveform samples produced by A/D converter 36 as well as the waveform identification code transmitted along cable 12.

Panel 24 is provided with a conversion control network 46 with which the actuation by the A/D converter 36 may be selectively delayed depending upon which receiver waveform is to be sampled. For example, if receiver waveforms 30 are each sampled by starting the same amount of time after the firing of transmitter 16 or upon occurrence of its output pulse 26, the amount of useful waveform samples will vary as a result of receiver spacings "d". In order to preserve the end segments of the waveforms for subsequent analysis, conversion control network 46 is used.

Figure 3:
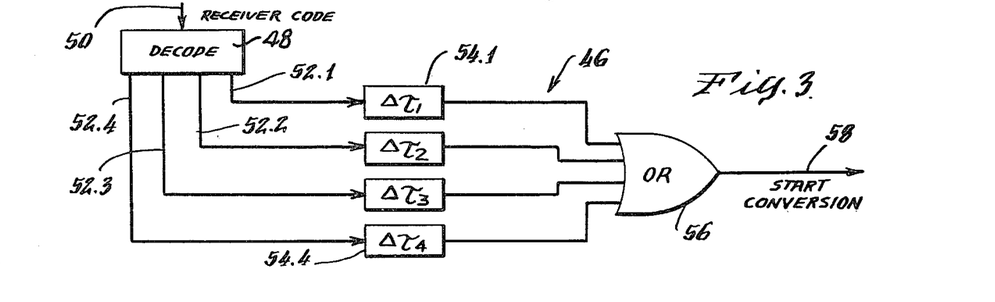
FIG. 3 is a schematic representation of a control circuit used to initiate an A/D converter.

As shown with greater detail in FIG. 3, network 46 includes a decode circuit 48 responsive to receiver or waveform identification signals on output line 50. The decode circuit 48 generates individual pulses on lines 52 representative of the particular activated sonic receiver 18. Each receiver identification pulse initiates a delay circuit 54 to inhibit actuation of the A/D converter 36 until such time when the earliest acoustic wave could arrive. Thus, as shown with waveforms 30.1 and 30.2 in FIG. 2, the A/D conversion for each receiver waveform is delayed a known time, $\Delta \tau$, which is a function of the distance betwen receiver 18 and transmitter 16 and the fastest expected velocity of the acoustic wave.

The delay $\Delta \tau_1$ for the first sonic receiver is selected equal to $(v \times S) - K$ where v is the fastest compressional wave velocity in microseconds per foot, S the distance between receiver 18.1 and transmitter 16 and the value of K is selected sufficient to commence the conversion process at least a small known instant before wave arrival. The delays of the conversion of electrical waveforms from the other receivers 18 are determined in a similar manner. Hence, for a spacing of S equal to eight feet, the spacings "d" of one foot each, and with a value of K equal to 12 microseconds, the respective delays from the time of firing of any transmitter pulse 26 are $\Delta \tau_1 = 308 \mu$ seconds, $\Delta \tau_2 = 348 \mu$ seconds, $\Delta \tau_3 = 388 \mu$ seconds and $\Delta \tau_4 = 428 \mu$ seconds.

These delays may be obtained using logic or analog delay circuits. The delays, once set, should remain constant so that index values employed in the operation of signal processor 40 are referenced to a common time such as the transmitter pulses 26. The outputs of delay circuits 54 may be combined with an OR circuit 56 to provide the desired enabling pulse on line 58 to commence A/D conversion.

The A/D converter 36 commences conversion at the end of each delay $\Delta \tau$. The conversion process continues for a sufficient time period to provide samples of the portions of the waveforms of interest. When a sampling rate of four microseconds is employed, a total of 512 samples, or about two milliseconds, of waveform duration as sufficient in many cases to determine acoustic wave parameters for such sonic waves as the compressional and shear waves. The number of samples used in any one group may be varied with 512 being generally used herein as an illustrative example. The number of samples is likely to change with the sampling rates with a greater number of samples being used with higher sampling rates and less samples with a lower rate. Hence, A/D converter 36 is provided with a suitable counter (not shown) which terminates the conversion process when the desired number of samples 60 (see FIG. 2) have been generated. The A/D conversion of each waveform 30 results in the generation of a group identified at 62 in FIG. 2 of 512 samples 60 as shown in FIG. 2.

Since each sample 60 occurs at a known sampling rate, any one sample has an index value which can be directly related to the time interval measured from the time of occurrence of the sonic pulse 26 which caused the waveform. Thus the first sample 60.1 in group 62.1 occurs at a time equal to $\Delta \tau_1 + (N \times SR)$, where N is the index position value (N=0 for the first sample) and SR is the sampling rate in microseconds. In a similar manner, each sample 60 in the other groups 62.2, 62.3 and 62.4 can be precisely related in time to the regularly recurring sonic pulses 26.2, 26.3 and 26.4.

Thus, if the first motion in the compressional wave is detected for the sample in group 62.1 at index value N1, and in group 62.2 at index value N2, then the time $\Delta T$ for that wave to travel the distance between receivers 18.1 and 18.3 is equal to $(N2-N1)SR + (\Delta \tau_2 - \Delta \tau_1)$. With the highest wave velocity value of $40\mu$ seconds per foot and the receiver spacing $d_1$ of one foot, and four microsecond sampling rate, the velocity of the compressional wave in microseconds per foot is $(N2-N1)\times 4+40$.

In some instances, the delay factors $\Delta\tau$ are so set that the A/D conversions for the receiver waveforms each begin the same interval in time after the occurrence of a sonic pulse 26. In such case the delay factors $\Delta\tau$ are all, for example, equal to zero or $\Delta\tau_1$. The measurement of a wave velocity may then be made directly by subtracting the indices for the first motions and multiplying the difference by the sampling rate.

The samples applied to processor 40 are assembled in groups of 512 samples with each group properly coded to identify a waveform from a particular receiver. The processor 40 is provided with a buffer to enable accumulation of a pair of sets of waveforms, wherein each set represents waveforms from all four receivers during a full operational cycle of the transmitter-receiver. Access to the buffer is under control by A/D converter 36 to enable transfer of the samples as they are produced.

FIGS. 15, 16, 17, 18 and 19

As described in the copending parent application Ser. No. 928,389, filed July 27, 1978, with further detail, various methods for automatic determination of an acoustic wave parameter, such as the velocity of the compressional wave, while a tool 10 is advanced along a borehole are described with the use of a signal processor 40. A processor suitable for processing of waveform signals may be such as identified as a PDP-11 and manufactured by the Digital Equipment Corporation. A first step involves the regular actuation of the transmitter 16 and sequential enabling of receivers 18.1, 18.2, 18.3 and 18.4. As each sonic receiver is enabled, it produces a waveform 30, which is converted to samples. Each waveform is converted to a group of samples 62 as previously explained with reference to FIG. 2. A cutation of transmitter 16 occurs independently of the operation of the conversion of the waveforms to samples. The conversion, however, as illustrated in FIG. 2, is completed before the next transmitter pulse is generated.

Since the index position N of each sample in its group also determines the time that sample was made relative to the transmitter pulse, an index position number may be attached to each sample by appending a nine bit word to the assembled sets. Such index identification can be added by scanning a set of groups and appending the value of a counter which is incremented following the count of each sample in a group. Alternatively, where the additional word length is not conveniently used, the index position for each sample in a group can be determined by scanning the entire group and thus compute a sample's address.

Figure 4:
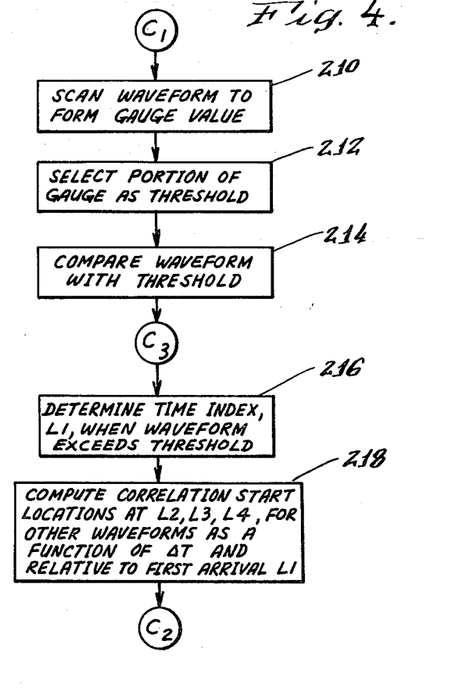
FIGS. 4 and 5 are flow charts for processes in accordance with the invention to determine the location of a wave in a waveform in accordance with the invention.
Figure 5:
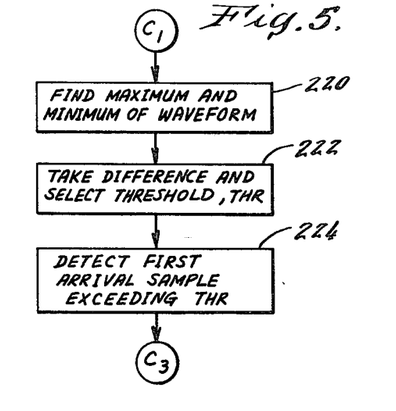
Figure 6:
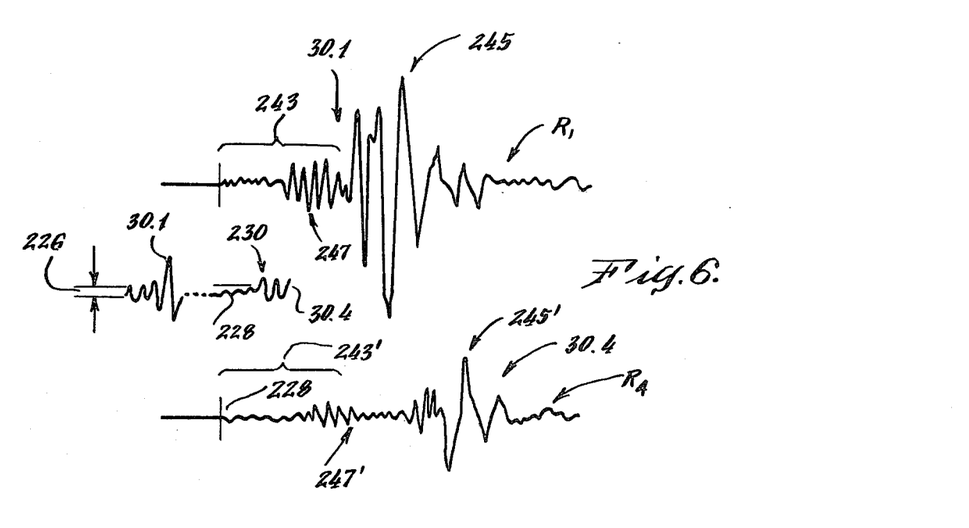
FIG. 6 is a representation of waveforms processed with the methods of FIGS. 4, 5 and 7.

FIGS. 4, 5 and 6 illustrate techniques for determining the location of a wave in the waveforms in a set. In FIG. 4 a first compressional wave motion is shown detected by initially obtaining at step 210 a measure or gauge value of the magnitude of a waveform such as 30.1 (see FIG. 2). Thereupon at 212 in FIG. 4 a threshold value, which bears a predetermined relationship to the measured magnitude, is obtained. The waveform is scanned again to compare it at 214 with the threshold value and the time index, L1, is noted when the waveform first exceeds the threshold value. The compressional start locations in the other waveforms in the set are similarly determined. The time index values L1, L2, L3, and L4 may then be used at 218, for example, as a starting place for a multifold correlation computation as more particularly described in the aforementioned patent application Ser. No. 928,389.

As shown in FIG. 5 the gauge forming step 210 involves, for sampled waveforms, the scanning of a predetermined number of the samples in a first group to select the maximum and minimum values at step 220. This predetermined number may be all of the samples in a group or some other series of samples which include the segments of the waveform of interest. Hence, as used with respect to the methods for detecting first motions as described herein, the waveform scanning step may include all of a waveform or those initial portions of the waveform expected to represent the sonic wave of interest as well as an indication of the magnitude of the waveform in the vicinity of the sonic wave.

The gauge is an absolute number and can be considered a peak-to-peak measurement. The difference between maximum and mimimum values is taken at step 222 to produce a measurement equivalent to the peak-to-peak value $A_1$ of waveform 30.1 shown in FIG. 1. A threshold value is then computed by selecting a predetermined portion of the gauge value. Such threshold value depends upon the amount of waveform which is scanned. When the scanning step is limited to waveform samples which include the compressional and shear waves, a threshold value is selected with a magnitude which is about ten percent of the gauge value. This fraction for the threshold may be varied, but its chief characteristic of being a function of the magnitude of the waveform is retained.

The first motion can then be detected by comparing the samples 60 (see FIG. 1) in the first group 62.1 of waveform samples with the threshold at 224 (see FIG. 5). When a sample exceeds the threshold, the index value in the group 62.1 for that sample, e.g. N1, becomes a measure of the time of arrival of the compressional wave at the first sonic receiver 18.1.

Figure 7:
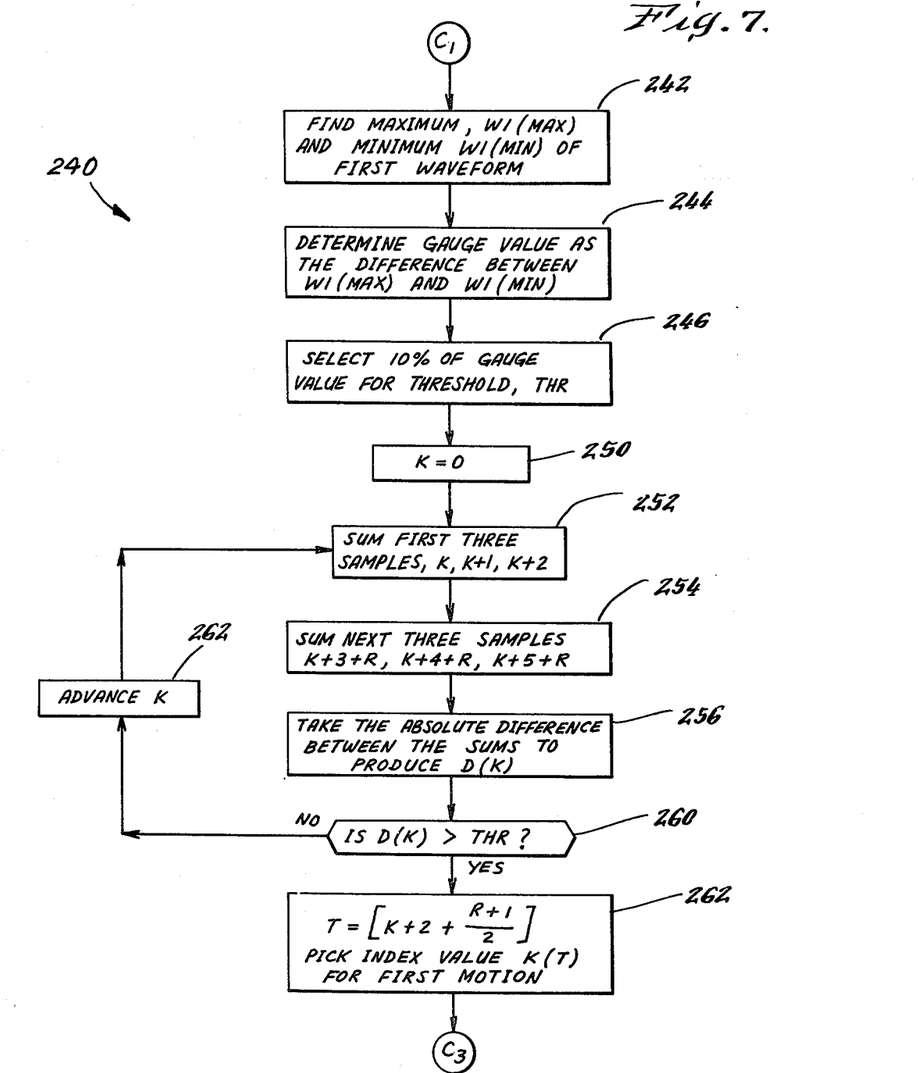
FIG. 7 is a flow chart of more detailed process steps for use with the method shown in FIG. 4.

FIG. 7 illustrates with still greater detail a first arrival detection method 240 for detecting the first motion of the compressional wave as generally referred to in FIG. 4 at steps 210, 212 and 214. The method 240 is illustrated for use with a method of processing sampled waveforms as described with reference to FIGS. 1-3. Hence, the method 240 is employed after a set of samples is avilable for processing.

A first waveform W1 of 62.1 (see FIG. 2) is scanned and the maximum and minimum values, respectively W1 (MAX) and W1 (MIN) and their associated index values N(MAX) and N(MIN) determined at 242. Note that the scanning step 242 may be limited to an initial portion of samples in group 62.1 in order to obtain a measure of the magnitude of the waveform in the vicinity of the compressional wave. The number of samples to which the scanning step may be limited depends upon the sampling rate and the time when sampling began following a transmitter pulse. Thus with reference to FIG. 6, the scanning step may be limited to the portion identified by bracket 243 or the entire waveform may be scanned. In the latter case, the peak-to-peak amplitude value at 245 is measured, while in the former case the gauge value is determined by the waveform at 247. The absolute difference between these sample values is then taken at 244 to establish a gauge value and a threshold (THR) in an amount of a fraction of the gauge such as ten percent of the gauge value is computed at 248.

The detection of a first motion is made by computing a discriminator value D(K) as a function of different index values K into the first group of samples 62.1. The discriminator is determined by the following computation.

$$[D(K) = |A(K+R+5) + A(K+R+4) + A(K+R+3)] - [A(K+2) + A(K+1) + A(K)]|$$

where the values A(K) represent samples at indices 0, 1, ... etc. depending upon the value of K. R represents a separation or skip factor expressed in number of index values. R is used to reduce sensitivities to waveform noise by separating the sequential waveform portions being compared. R tends to be greater when the sampling rate is low. Generally a value for R=3 is useful with sampling rates of the order of about four to eight microseconds. Other values of R, even zero, may be used to compare the sums of successive samples. Hence, in effect for an initial value of K=0, entered at 250, the absolute value discriminator D(K) is computed by forming a first sum at 252 of the first three successive samples 60.1, 60.2, 60.3 selected at 250. A second sum of three samples 60.4, 60.5 and 60.6 is formed at 254 and an absolute difference between the sums is taken at 256.

A comparison is then made at 260 as to whether the computed discriminator D(K) is greater than the threshold THR. If not, then the value of K is advanced, such as with an increment of one, at 262 and a new discriminator computed. When the decision at 260 is affirmative, the discriminator computation is terminated and the value for K(T) corresponding to the last value of the discriminator is selected at 262 as the index value for the first arrival of the compressional wave. This value is determined by the relationship K(T)=[K+2+R+1/2]. Upon completion of the first motion detection method 240, the start locations for the correlation determination method shown in FIG. 4 can be carried out.

The value of employing a first motion detection method such as 240 can be appreciated with reference to the waveforms 20.1 and 30.4 shown in enlarged form in FIG. 6. The waveforms are shown vertically aligned. though their relative amplitudes are different. A conventional well known method for detecting the first motion involves the selection of a threshold 226 whose value is chosen at an optimum level selected to detect most first arrivals. Occasionally, a waveform such as 30.4 of generally smaller amplitude occurs with a first arrival 228 whose amplitude is less than the threshold thus causing "cycle skipping". The resulting first motion detection for waveform 30.4 will be in error by an amount dependent upon the location of the wave 230 which is sensed with the threshold.

With a first motion detection method as illustrated in FIGS. 4, 5 and 7 a variable threshold is used. The threshold is related to the general amplitude of the waveform, thus rendering the first motion detection a more reliable measurement.

FIGS. 8, 9, 10, 11A and 11B

Figure 8:
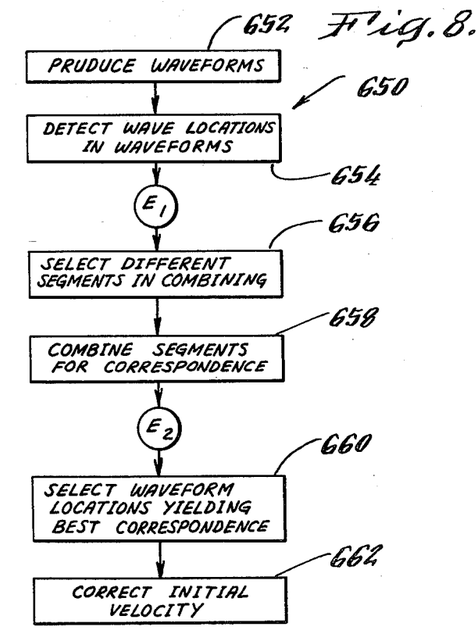
FIG. 8 is a flow chart of steps for a pattern detection method to determine an acoustic wave parameter in accordance with the invention.

FIG. 8 illustrates a pattern detection method 650 for use in measuring a wave's velocity from a set of waveform samples by making a pattern comparison between waveforms. The pattern comparison method commences with the step 652 of producing waveforms. The waveforms may be generated in analog or sampled form and obtained in real time from receivers 18.

When a set of waveforms has been generated, the first motions in a pair of waveforms W1 and W2 are detected with step 654, using a method such as explained with reference to FIGS. 4, 5 and 7. The detections of the first motions identify the time when these arrivals are detected relative to the time of occurrence of the transmitter pulses which caused the waveforms. These first arrivals can thus provide an initial measurement of the transit time for the compressional wave by comparing the times for these first arrivals. A pattern comparison is then carried out to generate a correction factor for the initial transit time measurement so that an accurate velocity measurement for the compressional wave can be obtained.

At step 656, different segments of the waveforms around the measured first arrivals are selected for combining at step 658 in a manner which reflects the correspondence between the selected segments.

The segment selection step 656 involves varying the relative time positions or alignments of the segments so that a range of pattern values can be produced when these differently aligned segments are combined. These pattern values are then scanned at step 658 to determine the best pattern value which reflects the best correspondence between segments. The relative time position of the segments which yielded the best pattern value is then used at 660 to provide a comparison correction factor for refinement of the initial transit time derived from the first motion detection step 654.

Figure 9:
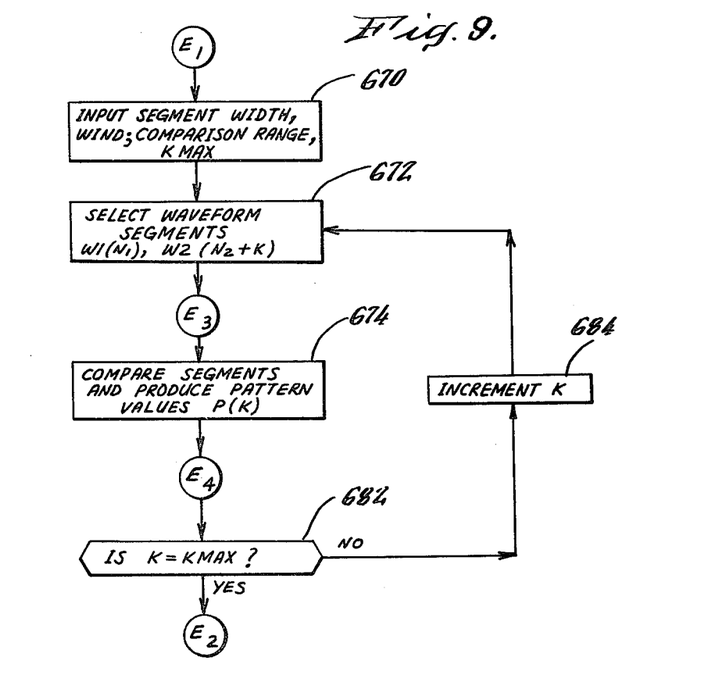
FIG. 9 is a flow chart of more detailed steps for use with the method steps shown in FIG. 8.

FIG. 9 illustrates additional process details for carrying out steps such as 658 and 656 of FIG. 8. The method steps of FIG. 9 are particularly useful in connection with a set of sampled waveforms and are intended for use with a processor such as described usable for the method shown in FIG. 7.

At 670 input parameters are entered such as the width or number of samples in the pattern segments, WIND. In addition, a comparison range, KMAX, is entered as an index value to enable the pattern comparison method to be restricted within a desired range of samples in the vicinity of the detected first motions.

An initial set of waveform samples are then selected at 672. The segment of waveform samples for waveform W1 commences at index N1 corresponding to the first motion detection sample, while the segment for waveform W2 commences at an index value determined by the index for the detected first motion sample, N2, plus an increment factor K.

Figure 10:
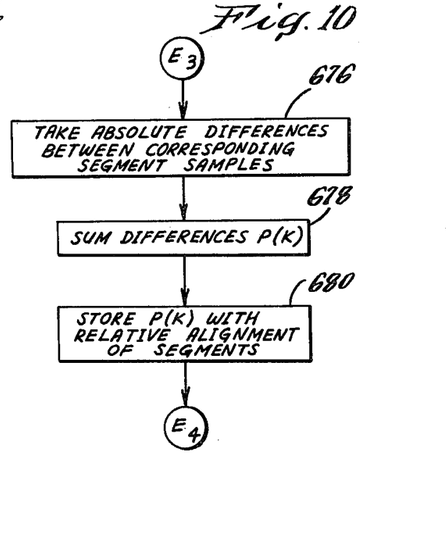
FIG. 10 is a flow chart of steps for use with the method shown in FIG. 9.

The corresponding samples in the segments selected at step 672 are compared and their differences summed at 674 to establish a pattern value. FIG. 10 illustrates further details for these steps where at 676 absolute differences between corresponding samples in a segment are formed. These differences are summed at 678 to yield a pattern value P(K) indicative of the correspondence between segments. The pattern value P(K) is stored at 680 together with an index number represented by K indicative of the relative alignment between segments.

A test is made at 682 in FIG. 9 as to whether all the pattern values have been determined. If not, the value for K is incremented at 684 and steps 672, 674 and 682 repeated. When the test 682 yields an affirmative answer, next steps such as 658 and 660 in FIG. 8 are performed to obtain a corrected velocity determination.

Figures 11A, 11B:
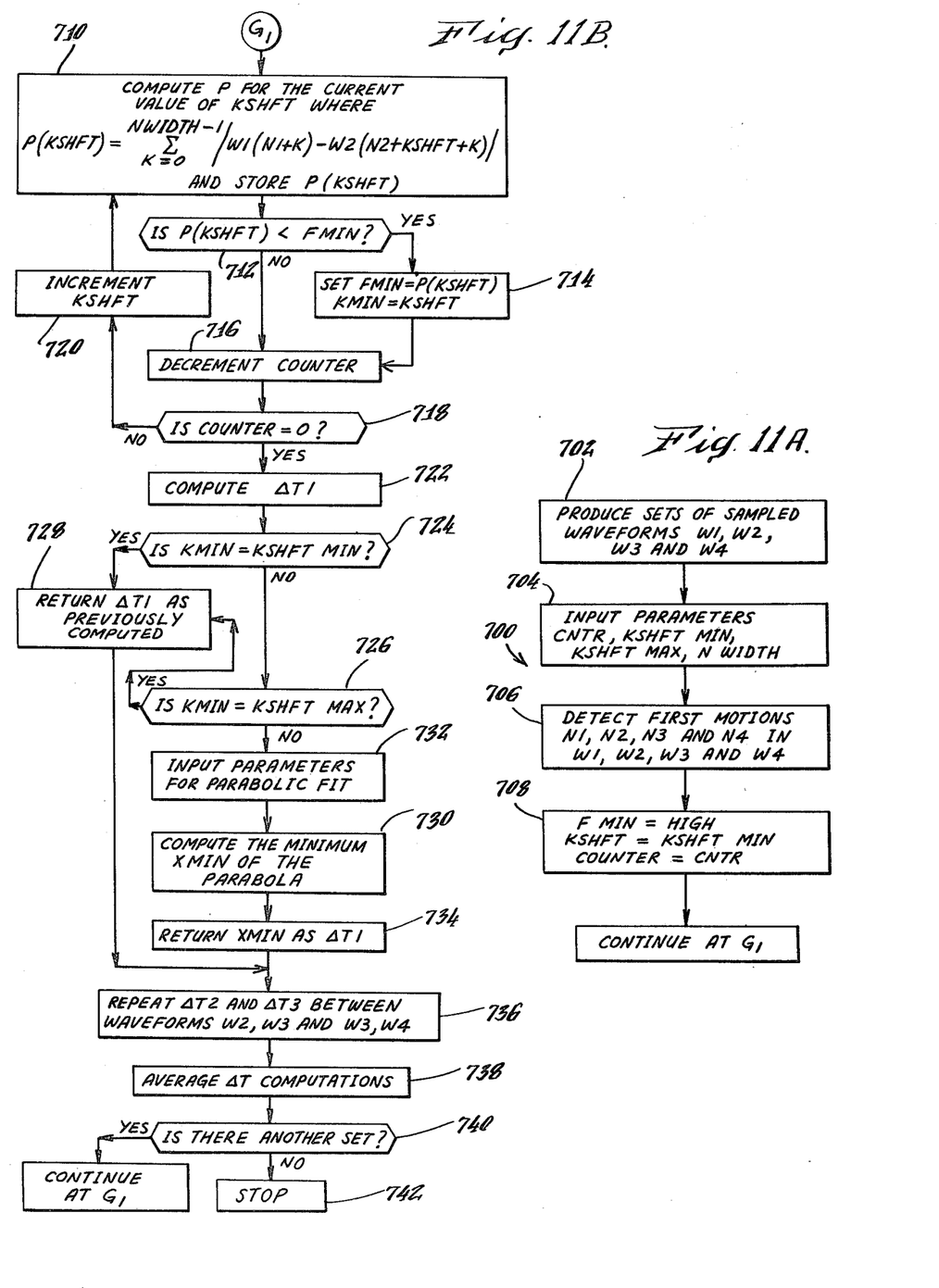
FIGS. 11A and 11B are flow charts of more detailed steps for use with the method shown in FIG. 10.

FIGS. 11A and 11B show a pattern comparison method 700 for determining the velocity, $\tau T$, of a compressional wave with further step details. The pattern velocity measuring process commences at 702 with the step of producing a set of sampled waveforms W1, W2, W3 and W4 for investigation. Since the speed of completing the method 700 can be very high, the waveforms may be produced directly in real time from receivers 18 during a sonic borehole investigation.

At step 704 input parameters are entered. These include a number, CNTR, which determines the number of pattern comparisons to be made and limit values for variable, KSHIFT, as identified by KSHFT MIN and KSHFT MAX. A value K is entered to establish the index sample in the segments being compared. The number of samples, NWIDTH, in each comparison segment is also entered at 704. The width of the segments generally is selected on the basis of the sampling rate SR.

The first motions for waveforms W1-W4 are detected with step 706 using a method such as previously described with reference to FIG. 7. The first motions are identified by index values N1, N2, N3 and N4. These index values are referenced with respect to the first samples in each waveform. In the event the waveform sampling was delayed by a time period $\Delta\tau$ as previously explained with reference to FIGS. 2 and 3, the latter delay factor is to be included in a determination of the compressional wave transit time from index values N1, N2, N3 and N4. However, when no such delay $\Delta\tau$ was employed and sampling began with the time of occurrence of a transmitter sonic pulse, the difference in index values for the first motions, such as, for example, N1 and N2, is related to the compressional wave velocity or transit time by the relationship (N2-N1)*SR where SR is the sampling rate in microseconds.

At step 708 in FIG. 11A several initial values are determined for FMIN, the lowest pattern value determined at step 710; KSHFT a variable which enables one waveform segment to be moved relative to the other and is initially made equal to the lowest value in the range, KSHFT MIN; and a counter is made equal to the value of CNTR.

Pattern comparison values P(K) are formed at 710 in FIG. 11B between samples in selected waveform segments of waveforms W1 and W2 according to one relationship as follows:

$$P(KSHFT) = \sum_{K=0}^{NWIDTH-1} |W1(N1 + K) - W2(N2 + K + KSHFT)|$$

where KSHFT varies from KSHFT MIN to KSHFT MAX which, for example, may have the values of $-3$ and $+3$ respectively. KSHFT varies at intervals of one. The locations of the waveform segments are determined by the index notations for the waves. Thus the segment for wave W1 is initially located with its lowest index valued sample at N1 for K=0. The lowest index value for the segment for wave W2 is initially located at index value N2+KSHFT. Since KSHFT has an initial value of KSHFT MIN, the second segment is effectively aligned at an earlier index position with respect to the segment for waveform W1 as determined by the value of KSHFT MIN.

The pattern values P(KSHFT) are obtained by initially forming absolute differences between corresponding window samples for all values of K and the sum of the differences is stored together with the value of KSHFT.

A test 712 is made whether P(KSHFT) is less than FMIN and since the latter has an initially high value, the result is affirmative. FMIN is then replaced by the pattern value P(K) and the value of KSHFT, namely $(-3)$ is stored as KMIN at 714.

The counter is then decremented at 716, and if the test 718 yields a negative answer, the value of KSHFT is incremented by one at 720 and the pattern computation repeated. This process continues throughout the range of KSHFT, i.e. for seven values, and when the entire set of seven pattern values have been computed, the lowest value P(MIN) reflecting the greatest similarity or correspondence between segments is stored as FMIN, and the associated index value for KSHFT is stored in KMIN.

A value for $\Delta T$, the compressional wave interval transit time, may then be computed at 722 according to the relationship:

$$\Delta T = (N2 - N1 + KMIN) * SR$$

where SR is the sampling rate in microseconds and there is no $\Delta\tau$ delay factor as described with reference to FIG. 2 to introduce in the computation.

The best index value, however, is recognized as possibly being located at some intermediate value between samples. Accordingly, the adjoining pattern values P(KSHFT), around the lowest or best comparison value are used to form a best parabola fit. The index value where the parabola forms an actual minimum is then chosen as a correction to the $\Delta T$ measurement.

Such parabola fit, however, cannot be made if the best index value KMIN is located at the edge of the range for KSHFT. Accordingly, a test 724 is made to determine if KMIN is at the lower edge of the range, or at the upper edge with test 726. If either test result is affirmative, the previously computed $\Delta T$ at step 722 is returned with step 728 as the measured wave velocity value between waveforms W1 and W2.

However, when both tests 724, 726 result in negative answers, a parabola fit is made using the adjoining values P around KMIN. Thus the parabola fit is formed and its minimum index value determined at 730 according to the relationship $$XMIN = X1 - \frac{\Delta X * (Y2 - Y1)}{2 * (Y2 + Y0 - 2 * Y1)}$$

where the parameters for this are entered at 732 as:
Y0 = P(KMIN - 1)
Y1 = P(KMIN)
Y2 = P(KMIN + 1)
X1 = $\Delta T$(as determined at step 722)
$\Delta X$ = SR The value for XMIN = $\Delta T$ is then used at 734 as the compressional wave velocity value $\Delta T1$ measured between waveforms W1 and W2.

The previously described pattern comparison method is repeated at step 736 to measure the wave velocity values $\Delta T2$ between waveforms W2, W3 and $\Delta T3$ between waveforms W3 and W4.

When all three values, $\Delta T1$, $\Delta T2$ and $\Delta T3$ have been measured, an average may be obtained at step 738 and used to represent the wave velocity for the set of waveforms. A test 740 is made whether additional sets of waveforms are present. If so, the $\Delta T$ pattern measurement process is repeated by returning to the step at G1. When no further waveforms are available, the process is stopped at 742.

Having thus described method and apparatus in accordance with the invention for determining the loca- tion of an acoustic wave in a waveform detected during sonic borehole logging, the advantages of the invention can be appreciated. Variations of the specific steps and devices described herein may be adopted while remaining within the scope of the invention as set forth by the following claims.

What is claimed is:

1. A method for automatically determining the location of an acoustic wave in a waveform which is representative of the output of a sonic receiver during well logging comprising the steps of scanning the waveform to form a gauge value indicative of maximum amplitude of the waveform;

selecting a predetermined portion of the gauge value to establish a threshold value;

forming combinations of initial portions of the waveform; and comparing the combinations with the threshold value to identify the place where the waveform exceeds the threshold as the location of the acoustic wave.

2. A method for automatically determining the first motion of an acoustic wave among samples of a waveform representative of the output of a sonic receiver during sonic well logging comprising the steps of scanning waveform samples to form a gauge value representative of a maximum amplitude measurement of the waveform;

selecting a predetermined portion of the gauge value to establish a threshold; and comparing combinations of samples of the waveform with the threshold to select the sample indicative of the first motion.

3. The method for automatically determining the first motion as set forth in claim 2 wherein the scanning step further includes selecting the maximum peak-to-peak amplitude of the waveform samples as the gauge value.

4. The method for automatically determining the first motion as set forth in claim 3 wherein the threshold establishing step further includes selecting a predetermined fraction of the maximum peak-to-peak amplitude as the threshold.

5. The method for automatically determining the first motion as set forth in claim 2 wherein the comparing step further includes the step of commencing the comparing step by combining earlier occurring samples and proceeding deeper into the waveform with successive samples to form successive combinations until the threshold is exceeded to determine the first motion of the earliest compressional acoustic wave.

6. The method for automatically determining the first motion as set forth in claim 5 wherein the comparing step still further includes the steps of forming combinations of samples as first and second sums of a preselected number of successively located samples;

forming the difference between the first and second sums; and comparing the difference with the threshold to detect the first motion.

7. A method for automatically determining the first motion of an acoustic wave in a waveform representative of the output from a sonic receiver located in a borehole to respond to acoustic waves which have traveled through an acoustic responsive medium after a sonic pulse transmitter has generated acoustic pulses in the borehole to launch sonic waves comprising the steps of sampling the receiver waveform to generate a waveform composed of samples carrying amplitude information of the receiver waveform and having index positions with known time intervals from the time of occurrence of the transmitter sonic pulse which caused the receiver waveform;

forming a gauge value representative of the magnitude of the received waveform;

selecting a predetermined portion of the gauge value to establish a threshold value; and comparing combinations of waveform samples with the threshold value to determine the index position of the sample exceeding the threshold as indicative of the first motion of the acoustic wave.

8. A method for automatically determining the location of an acoustic wave in a plurality of waveforms derived from at least two selectively spaced sonic receivers operated in a borehole investigation comprising the steps of producing a set of waveforms representative of sonic waves detected by the sonic receivers;

detecting the acoustic wave in the set of waveforms to establish locations of the acoustic wave in the respective waveforms;

combining predetermined pattern segments of the waveforms in the vicinity of the established locations to obtain measurements of correspondence between the segments as a function of waveform locations; and selecting the waveform locations which yield the best measurement of correspondence as the determined locations of the acoustic wave in the waveforms.

9. The method for automatically determining the location of the acoustic wave in the waveforms as claimed in claim 8 wherein the combining step further includes the steps of selecting successively different pattern segments in the vicinity of the established wave locations; and comparing the different pattern segments from different waveforms to produce pattern values representative of the correspondence between the segments as a function of their respectively associated waveform locations.

10. The method for automatically determining the location of the acoustic wave in the waveforms as claimed in claim 9 wherein the detecting step further includes the steps of scanning each waveform to form gauge values respectively indicative of the amplitudes of the waveforms;

selecting a predetermined portion of each gauge value to establish threshold values for the waveforms; and comparing combinations of samples of each respective waveform with its established threshold value to identify the locations where the respective waveforms exceed their threshold values as the location of the acoustic wave.

11. A method for automatically determining an acoustic wave parameter for well logging from waveforms representative of the outputs of a plurality of sonic well logging receivers whose waveforms occur in response to sonic pulses regularly generated by a sonic pulse well logging transmitter which is selectively vertically spaced from the sonic well logging receivers comprising the steps of sampling at least two of the waveforms from different receivers to generate sets of waveforms, with the waveforms being formed with samples having index positions which are representative of a known time interval as measured with respect to the sonic well logging pulse responsible for the waveforms;

detecting samples representative of the first arrivals of an acoustic wave in each of said at least two waveforms in each set and determining the index values associated with the detected first arrival samples;

comparing patterns of selected portions of at least two different waveforms in a set in the vicinity of the index values determined for the first arrival;

producing pattern values representative of pattern comparisons between relatively index shifted waveform portions;

selecting an acoustic wave parameter correction factor corresponding to the pattern value representative of a preferred similarity between the compared waveform portions; and computing the acoustic wave parameter from the index values for the first arrivals of the pattern compared waveforms in accordance with the correction factor.

12. A method for automatically determining a parameter of an acoustic wave present in a waveform representative of acoustic waves detected with a sonic borehole logging tool having a sonic pulse generator and a plurality of serially spaced sonic pulse receivers selectively spaced from the sonic pulse transmitter in the borehole to produce waveforms representative of the acoustic waves generated by the sonic pulse generator comprising the steps of converting the waveforms representative at the output from each sonic receiver into a group of samples of a known sampling rate, each sample being representative of the magnitude of the waveform at an index value which occurs at a known time interval following the sonic pulse which caused the waveform;

assembling groups of samples into sets wherein the groups of samples in a set are closely related in time;

scanning samples in each group in a set to determine an arrival index value for the sample indicative of the arrival of the acoustic wave at the sonic receiver from which the group of samples was derived;

selecting from a first group a first predetermined number of samples having indices in the vicinity of the arrival index value for the first group;

selecting from a second group a corresponding number of samples as the first predetermined number, with the selected samples from the second group having initial indices in the vicinity of the arrival index value for the second group;

subtracting the selected samples in the second group from the selected samples in the first group and summing differences between successive samples;

shifting the selection of samples from the second group to a corresponding number of samples having index values which are shifted by a preselected index number;

repeating the subtracting, summing and shifting steps for a selected range of index values;

determining the number of index shifts of the samples in the second group needed to yield a minimum value for the summed differences; and modifying a difference between the arrival index values for the first and second groups by the determined number of index shifts and as a function of the sampling rate to determine the acoustic wave parameter.

13. A method for automatically determining a parameter of an acoustic wave present in a waveform representative of sonic waves detected with a sonic borehole logging tool located in a borehole and having a sonic pulse generator and a plurality of at least three serially spaced sonic receiver selectively spaced from the sonic pulse transmitter to produce waveforms representative of the acoustic waves launched by the sonic pulse generator comprising the steps of digitizing the waveforms into groups of discrete successive samples representative of the amplitude of the waveforms at successive time intervals determined by the sample rate, each sample of a waveform having a known index position relative to the launching time of the sonic pulse which caused the waveform;

subtracting a predetermined number of samples with initial index positions in one group from a corresponding number of samples in another group where the index positions of the corresponding digital samples in the other group have a known index value;

summing differences between corresponding samples;

selecting samples of successively indexed positions for the predetermined number of samples from the one group and the other group;

repeating the subtracting and summing steps for successively different index samples to form sums of differences corresponding to the different index positions;

counting the number of index increments associated with the least difference; and combining the index value for the samples yielding the lease difference with the counted number of index increments to determine the acoustic wave parameter.

14. A method for automatically determining the velocity of the compressional wave launched in a formation along a borehole with a sonic borehole logging tool having a sonic pulse generator and a plurality of serially spaced sonic waveform receivers located in the borehole for producing waveforms representative of the acoustic waves incident upon the receivers comprising the steps of digitizing the waveforms into groups of discrete successive samples representative of the amplitude of the receiver waveforms at successive intervals determined by the sampling rate; each sample of a waveform having an index position which is a known time interval from the launching time of the sonic pulse which caused the waveform;

identifying in a first group of a sample representative of the arrival of the compressional wave at a first receiver from which the first group of samples was obtained;

comparing a selected number of samples in the vicinity of the sample representative of the arrival of the compressional wave with a corresponding number of samples in a group originating from a different receiver, and summing the comparisons between respective pairs of compared samples to form a measurement of the degree of similarity between waveforms from different receivers;

repeating the comparing and summing steps between samples of different index positions to measure the degree of similarity between waveforms over predetermined segments thereof;

selecting the lowest sum as indicative of the greatest similarity between waveforms; and combining the index value of the sample representative of the arrival of the compressional wave at the first sonic receiver with the number of different index positions needed to form the lowest sum to provide a measurement of the velocity of the compressional wave.

15. An apparatus for detecting the first motion of a sonic wave present in a waveform signal representative of sonic waves detected in a sonic borehole investigation comprising means for producing a gauge signal representative of the overall magnitude of the waveform signal;

means for producing a threshold signal representative of a predetermined portion of the gauge signal;

means for combining initial portions of the waveform signal; and means for comparing the combined portions with the threshold signal to generate a first motion signal when the waveform signal initially exceeds the threshold signal.

16. The apparatus for detecting the first motion of a sonic wave as claimed in claim 15 wherein the gauge signal producing means further includes means for selecting a maximum amplitude of the waveform signal;

means for selecting a minimum amplitude of the waveform signal; and means for forming the difference between the maximum and minimum amplitudes to provide the gauge signal.

17. An apparatus for automatically determining the first motion of an acoustic wave in a waveform signal representative of the output of a sonic receiver during sonic well logging, comprising means for producing a receiver waveform;

means for establishing a threshold value for said waveform;

means for combining at least two different initial portions of said waveform to provide first and second combinations and the difference between said first and second combinations;

means for comparing said difference in combinations with said threshold to determine the first motion of said waveform when said difference exceeds said threshold as an indication of the position of the acoustic wave in said waveform signal.

18. The apparatus of claim 17 wherein said waveform signal is formed of samples and wherein said combining means includes means for forming first and second sums of a preselected number of successively located samples.

19. The apparatus of claim 18 wherein the means for establishing a threshold value further includes means for scanning waveform samples and form a gauge value indicative of a magnitude of the waveform; and means for selecting a predetermined portion of said gauge value as said threshold value.

20. A method for automatically determining the first motion of an acoustic wave in a waveform signal representative of the output of a sonic receiver during sonic well logging comprising establishing a threshold value for the detection of said wave in the waveform;

forming first and second combinations of two different initial portions of said waveform;

forming the difference between said first and second combinations;

comparing the difference with the threshold value;

continuing said combinations and difference forming steps and said comparing steps for successively deeper initial portions of the waveform until said difference exceeds the threshold value to identify the first motion of said wave in the waveform.

21. The method for automatically determining the first motion in accordance with claim 20 wherein said combinations forming step includes a step of generating first and second sums of the amplitudes of a preselected number of successively located samples of the waveform.

* * * * *